April 19, 1966     L. W. LOWRANCE     3,247,394
ELECTRONIC DIGITAL COMPUTER POWER SUPPLY
Filed July 24, 1962
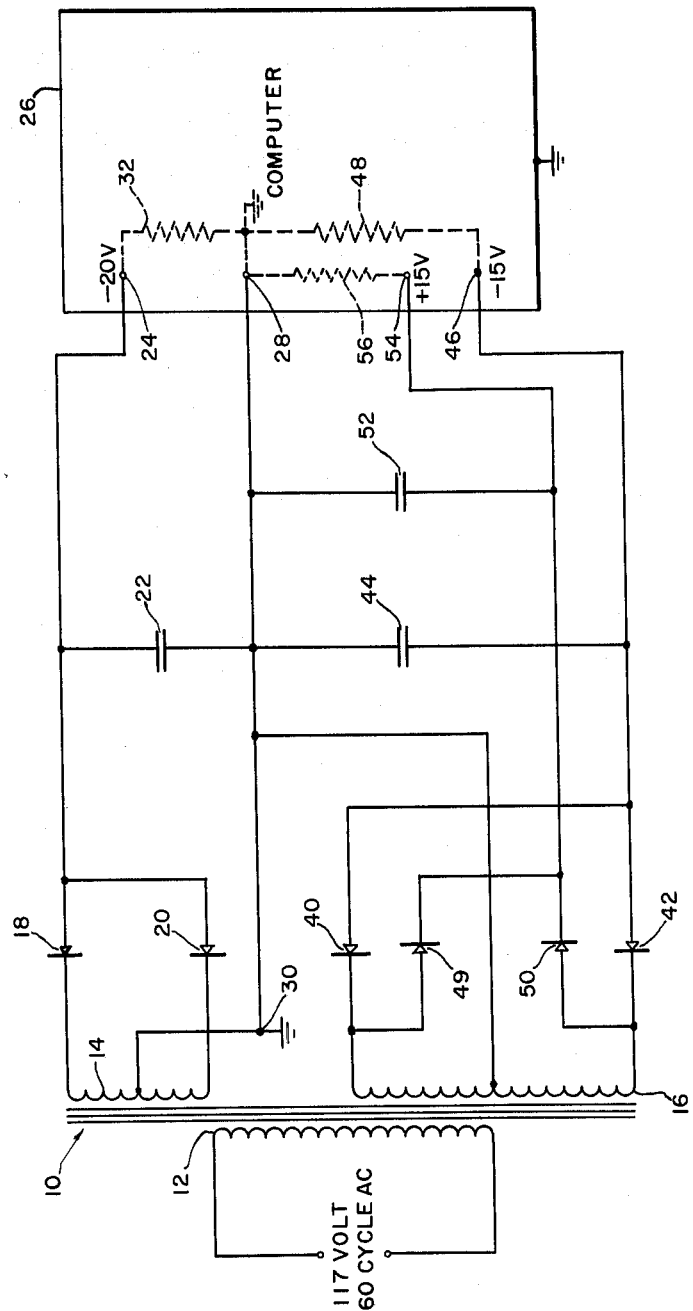
INVENTOR.
LELAND W. LOWRANCE
BY
ATTORNEY United States Patent Office 3,247,394
Patented Apr. 19, 1966

3,247,394
ELECTRONIC DIGITAL COMPUTER POWER SUPPLY
Leland W. Lowrance, Hawthorne, Calif., assignor to General Precision, Inc., a corporation of Delaware
Filed July 24, 1962, Ser. No. 212,089
3 Claims. (Cl. 307—58)

The present invention relates generally to power supply circuits, and it relates more particularly to an improved power supply for use in conjunction with an electronic digital computer to supply unidirectional exciting potentials to the computer, or for use in other electronic apparatus.

As will be described in more detail subsequently, the improved power supply of the present invention is constructed simply and inexpensively to permit variations in its unidirectional output voltages without adversely affecting the operation of the electronic apparatus excited thereby.

The present-day electronic binary digital computer usually includes a plurality of transistorized circuits, such as gates, bi-stable networks and the like. These circuits usually are excited by a plurality of different unidirectional potentials derived from a corresponding plurality of different direct current sources.

In order that the different circuits in the computer may operate properly and accurately, the prior art practice has been to regulate and stabilize the direct current power supply sources. This regulation and stabilization of the direct current power supply sources enables the direct current voltages produced by the different sources to be essentially constant, even in the presence of variations in the alternating current line voltage from which the direct current voltages are derived.

The provision of such highly regulated and highly stabilized direct current power supply sources in the prior art electronic digital computer has involved the requirement for relatively complex and expensive circuitry in the prior art power supplies used to supply the exciting direct current voltages to the computers.

The present invention is predicated upon the principle that the timing and accuracy of the computer is unimpaired in the presence of variations in the different direct current voltages supplied thereto, so long as the voltages all vary in the same ratio. Therefore, there is no real need for an expensive and complicated, highly stabilized and highly regulated power supply, so long as the power supply answers the above-mentioned criteria.

It is, accordingly, an object of the present invention to provide an improved and simplified power supply for an electronic digital computer, and for other electronic apparatus, which is inherently simple in its construction and yet which is capable of supplying direct current exciting voltages to the computer which can be utilized thereby without impairing in any way the accuracy or precision of the computer.

A feature of the invention is the provision of such an improved power supply which is constructed to provide several different direct current voltages for use by different load circuits in the computer, or in other electronic apparatus, and then the different direct current voltages being supplied by separate rectifier circuits each being provided with corresponding filter capacitance means.

In accordance with the concepts of the present invention, the capacitive values of the different capacitance means are chosen to provide the same time-constant for all the various rectifier circuits. This construction causes the different direct current voltages produced by the power supply to increase and decrease with a fixed ratio for corresponding increases and decreases in the alternating current line voltage.

As mentioned above, the variation of the direct current voltages produced by the power supply of the invention in a fixed ratio has no adverse effect on the timing or accuracy of the computer. Therefore, the power supply of the present invention, instead of being constructed to entail expensive and complicated voltage stabilizing and regulating circuitry, is constructed in a simple and inexpensive manner.

As described above, no attempt is made in the power supply of the present invention to regulate or stabilize the direct current output voltages. Instead, the power supply of the invention is constructed, without the need for any additional extraneous components, so that any variations in the different direct current output voltages produced by the power supply occur with a fixed ratio, so as to have no adverse effect on the electronic apparatus excited by the direct current voltages.

Other objects and advantages of the present invention will become apparent from a consideration of the following specification when taken in conjunction with the accompanying drawing in which the single figure illustrates a circuit diagram of a power supply constructed to incorporate the principles of the present invention.

The illustrated power supply circuit of the invention includes a usual power transformer 10. The power transformer 10 has a primary winding 12 which is connected to the alternating current line. The alternating current line provides, for example, a 117-volt, 60-cycle, alternating current line voltage to the primary winding 12 of the transformer 10.

The transformer 10, in the illustrated embodiment includes a first secondary winding 14 and a second secondary winding 16. Each of the secondary windings 14 and 16 includes a grounded center tap. The sides of the secondary winding 14 are connected to the cathodes of a pair of diodes 18 and 20. The anodes of the diodes 18 and 20 are connected together and to a grounded capacitor 22. The capacitor 22 in a constructed embodiment of the invention, has a capacity of 32,000 microfarads.

The common junction of the anodes of the diodes 18 and 20 and the capacitor 22 are connected to an input terminal 24 of an associated electronic apparatus 26. The electronic apparatus may, for example, be a binary digital computer. The apparatus 26 also has an input terminal 28 which is connected to a ground lead 30 in the power supply.

The computer is considered to present a first resistive load 32 across the terminals 24 and 28. In the constructed embodiment of the invention, for example, the terminal 24 provided a 20-volt exciting unidirectional voltage to the resistive load 32 of the computer.

The sides of the secondary winding 16 are connected to the cathodes of a pair of diodes 40 and 42. The anodes of the diodes 40 and 42 are connected together and to a grounded capacitor 44. In the above-mentioned constructed embodiment of the invention, the capacitor 44 has a capacity of 3600 microfarads.

The common junction of the anodes of the diodes 40 and 42 and of the capacitor 44 are connected to an input terminal 46 of the apparatus 26. The apparatus is considered to exhibit a resistive load 48 across the terminals 46 and 28. The terminal 46, in the constructed embodiment, provides a negative 15-volt direct voltage to the resistive load 48.

The sides of the secondary winding 16 are also connected to the anodes of a pair of diodes 49 and 50. The cathodes of the diodes 49 and 50 are connected together and to a grounded capacitor 52. In the constructed embodiment of the invention, the capacitor 52 was given a capacity of 2300 microfarads.

The common junction of the cathodes of the diodes 49 and 50, and of the capacitor 52, is connected to an input terminal 54 of the apparatus 26. The apparatus 26 presents a load 56 across the terminal 54 and grounded terminal 28. The power supply, in the above-mentioned constructed embodiment, supplies a positive unidirectional voltage of 15 volts to the terminal 54.

It will be appreciated, therefore, that the electronic apparatus 26 presents three distinct resistive loads, namely the loads 32, 48 and 56 to the power supply. These resistive loads are excited by three different unidirectional voltages. The unidirectional voltages, in turn, are produced by three separate rectifier circuits. As noted above, the power supplies of the prior art are usually constructed to include expensive and complicated extraneous circuitry for stabilizing and regulating the unidirectional voltages. These prior art power supplies attempt to provide the output unidirectional voltages with an unvarying amplitude, even in the presence of variations in the alternating current line input voltage.

However, in the improved and simplified power supply of the present invention, no attempt is made to regulate the power supply so as to maintain the unidirectional output voltages constant. Instead, the capacitors 22, 44 and 52 have selected values to form with their associated, respective resistive loads 32, 48 and 56, separate time-constant networks, each having the same time constant. In the constructed embodiment, load 32 is substantially 3 ohms, load 48 is substantially 26.7 ohms, and load 56 is substantially 41.8 ohms. The time constant of each separate network in the constructed embodiment is substantially .096 second.

Therefore, an increase in the input alternating current line voltage applied to the primary winding 12 of the transformer 10 causes all the unidirectional output voltages at the terminals 24, 46 and 54 to increase with a constant ratio. Likewise, a decrease in the value of the alternating current line input voltage causes all the output unidirectional potentials to decrease with a constant ratio.

As explained above, so long as there is no change between the relative values of the unidirectional potentials applied to a usual electronic digital computer, the timing and precision of the computer is unaffected. The power supply of the present invention takes advantage of this fact to provide a unique and simplified power supply for the computer, and one which is capable of providing direct current excitation for the computer of such a nature that the accuracy and the precision of the computer is unimpaired, despite large variations in the line voltage.

While a particular embodiment of the invention has been shown and described, modifications may be made, and it is intended in the claims to cover all such modifications as fall within the spirit and scope of the invention.

What is claimed is:

1. In combination: a source of alternating current potential for producing an alternating-current voltage subject to amplitude variations; a plurality of full-wave rectifier means coupled to said source for rectifying said alternating-current voltage and for producing a corresponding plurality of individual unidirectional output voltages also subject to amplitude variations in correspondence with amplitude variations of said alternating-current voltage; a corresponding plurality of individual loads respectively coupled to respective ones of said full-wave rectifier means to be excited by corresponding ones of said unidirectional output voltages; and a corresponding plurality of filter capacitor means respectively connected in shunt with respective ones of said loads, each of said filter capacitor means having a selected capacity value related to the resistance of the corresponding one of said loads so as to provide a plurality of networks all having the same time constant.

2. The combination defined in claim 1 in which said loads are resistive.

3. The combination defined in claim 1 in which said source includes a transformer having a primary winding for receiving the alternating-current potential and a plurality of secondary windings respectively coupled to respective ones of said full-wave rectifier means.

References Cited by the Examiner

UNITED STATES PATENTS

| | | | |
|---|---|---|---|
| 2,403,053 | 7/1946 | Conklin | 321—16 |
| 2,474,255 | 6/1949 | Kelly | 321—16 |
| 2,881,382 | 4/1959 | Amato | 321—16 |
| 2,978,178 | 4/1961 | Patterson | 235—193 |

MILTON O. HIRSHFIELD, *Primary Examiner.*

LLOYD McCOLLUM, *Examiner.*